F. L. O. WADSWORTH.
MACHINE FOR WORKING GLASS AND SIMILAR SUBSTANCES.
APPLICATION FILED FEB. 26, 1913.

1,198,979. Patented Sept. 19, 1916.

Witnesses
Frank A. Fahle
Josephine Gasper

Inventor
Frank L. O. Wadsworth,
By Arthur M. Hood
Attorney

UNITED STATES PATENT OFFICE.

FRANK L. O. WADSWORTH, OF PITTSBURGH, PENNSYLVANIA, ASSIGNOR TO BALL BROTHERS GLASS MANUFACTURING COMPANY, OF MUNCIE, INDIANA, A CORPORATION OF INDIANA.

MACHINE FOR WORKING GLASS AND SIMILAR SUBSTANCES.

1,198,979.   Specification of Letters Patent.   Patented Sept. 19, 1916.

Application filed February 26, 1913.  Serial No. 750,812.

*To all whom it may concern:*

Be it known that I, FRANK L. O. WADSWORTH, a citizen of the United States, residing at Pittsburgh, in the county of Allegheny and State of Pennsylvania, have invented a new and useful Machine for Working Glass and Similar Substances, of which the following is a specification.

My invention relates to improvements in apparatus for receiving and forming a succession of batches or portions of molten glass by pressing, blowing or other forming operations.

The particular objects of my improvement are to greatly increase the speed with which such operations may be carried on and to improve the quality of the product produced as a result of the operations.

To this end my present improvements involve two coacting series of receptacles which are brought alternately and successively into glass-receiving position without so much interval between successive positionings as would normally exist as a result of normal spacing of the receptacles.

Figure 1:
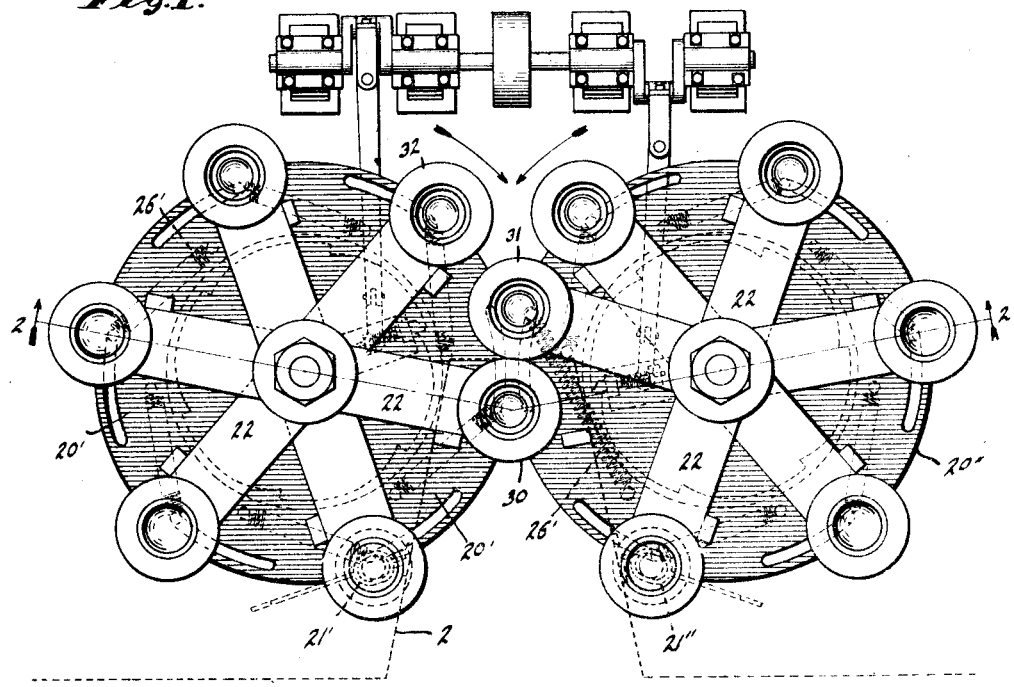
Figure 2:
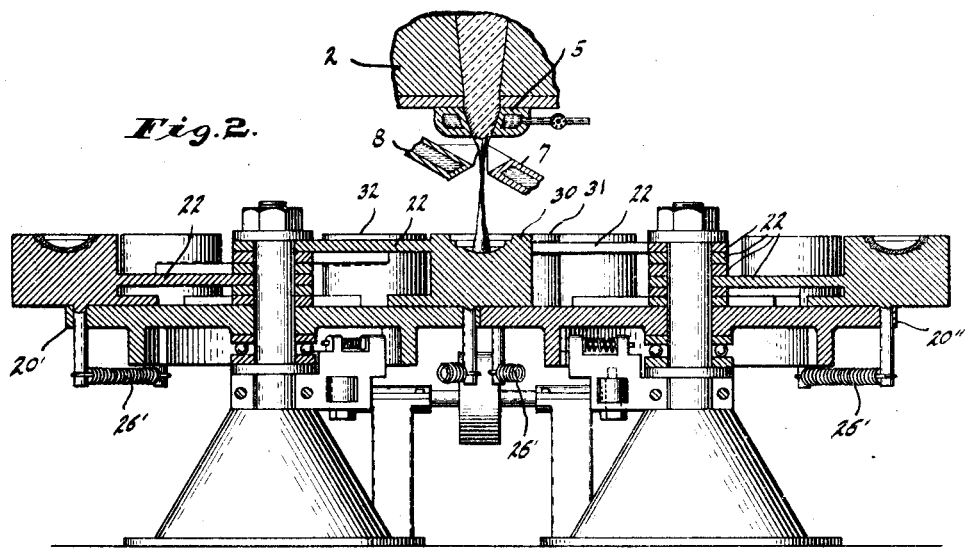

In the drawings which form part of this specification, Figure 1 illustrates a plan of two coöperating sets of molds each mold of which may be brought to a common filling position, and Fig. 2 is a vertical section on line 2—2 of Fig. 1.

In practising my present invention the glass is delivered to successive molds in the form of successive portions cut by suitable cutters (such as cutters 7, 8) from the end of a stream of glass flowing from a furnace or other source of supply 2. Automatically operating pressing and blowing machines are now well known and I have therefore made no attempt to fully illustrate or describe in detail such mechanism and in the drawings the receivers for the successive portions of glass, while denominated "molds" are merely indicated in a diagrammatic manner, it being well understood that any desired type of mold and coöperating parts may be readily substituted.

In the machine which forms the subject matter of this application two mold tables or mold carriers are provided, and the molds thereon are arranged in such manner as to be brought alternately into receiving position under the flowing stream of glass, *i. e.*, first a mold such as indicated at 30 on the table 20′ is brought to said position, then a mold 31 on the table 20″ is brought to said position, next a mold 32 on table 20′ is advanced to the receiving station, and so on continuously. In order to secure this alternate advancement of the molds first on one table and then on the other, and to simultaneously secure the reduction in the so-called placing interval, I mount each mold independently on its own arm 22 which is pivoted at the center on one of the mold tables and is capable of movement with respect to that mold table through an arc substantially equal to that subtended by the diameter of the mold itself. In this case the molds are brought to filling position when they occupy their normal position on their respective mold tables. Thus as shown in Fig. 1, the mold 30 which is under the flowing stream is positioned just one-sixth of a complete revolution from the mold which is under the press plunger 21′. The mold 31 which is mounted on the other mold table 20″, and which is next to be brought to filling position is displaced from its normal position through the angle already mentioned against the tension of a light spring 26′. When the mold 30 has been filled, the mold table 20′ is advanced one step thereby bringing the mold 30 into position under the press plunger 21′. The forward movement of this mold permits the mold 31 to be automatically thrown forward to its normal position on the table 20″ by the pressure of the spring 26′, the table 20″ itself remaining stationary. The latter part of the movement of the table 20′ causes the succeeding mold 32 on that table to be displaced against the tension of its restoring spring until it occupies a position on table 20′ corresponding to that previously occupied by the mold 31 on the table 20″. In the next movement of the apparatus the table 20″ is moved through one-sixth of a revolution thus bringing the mold 31 into position under the press plunger 21″ and allowing the mold 32 to be thrust forward by its spring into the filling position under the flowing stream of glass. As before, the latter portion of the table movement displaces the succeeding mold on that table until it occupies the relative position of the mold 31. These alternate movements of the two tables thus bring each mold on said tables in alternate succession under the flowing stream of glass and the actual mold movement required in each case is a movement through a much smaller arc than that normally separating the individual molds.

The use of two sets of molds supplied from a single flowing stream of glass has very decided advantages over the use of a single set of molds mounted on one table or carrier. In fact it considerably more than doubles the possible speed of operation of the machine. As has already been stated this speed of operation is determined by the intervals required for the pressing and blowing operations; and for a given article and a given temperature of glass these intervals are practically fixed by the time required for the setting of the molten material.

With two mold tables moving alternately the interval elapsing between the successive step movements of the molds on one table may be maintained the same as the intervals required in the operation of a single mold table while practically doubling the number of molds filled and operated upon in a given period of time. But in addition to this a decided advantage is gained by the fact that in order to fill the increased number of molds from a single flowing stream, the size of that stream must be correspondingly increased, and the temperature of the stream can then be correspondingly decreased. This in turn increases the possible speed with which the pressing and the blowing operations may be carried on while still allowing a sufficient cooling interval for the setting of the formed articles. The increase in the size of the stream, and the consequent increase in the rapidity of filling each individual mold has a further decided advantage in reducing the chilling effect of the mold upon the glass, and in correspondingly improving the quality of the product. The increase in the size of the stream, when it is operated upon by my improved cut-off mechanism, is also of advantage in securing a more perfect quality of glass from the furnace, both because such glass can be flowed at a lower temperature and because a greater proportion of the glass in the flowing stream is freed from any chilling surface contact with portions of the delivery, cut-off and mold parts.

The size of the flowing stream of glass may be varied to a considerable extent by varying the flow of cooling water through the hollow delivery plate 5, and thereby varying both the thickness of the chilled or congealed skin on the outside of the glass stream and also to some extent the temperature of the flowing glass itself. The rate of flow can also be varied by varying the temperature of the body of glass in the flow block chamber 2. If desired the flow can be further varied by altering the size of the orifice in the delivery plate or block 5 in any suitable manner, as, for example, by using adjustable gates. But I prefer to maintain the orifice in the block 5 at a uniform size, and regulate the volume of glass in each cut-off mass as far as possible by varying the thickness of the skin at the edge of the delivery orifice in the manner above described. If such regulation, together with the regulation of the temperature in the flow block chamber, is not sufficient to maintain the cut-off masses at predetermined uniform volume, I maintain that uniformity by regulation of the speed of the operation as a whole. It is of course understood that in this operation the mechanism which operates the cut-off blades is connected to and operated synchronously with the mechanism which actuates the mold carriers. In order to alter the volume of the cut-off means deposited in successive molds it is, therefore, only necessary to either accelerate or retard the speed of the driving motor by which the connected mechanism as a whole is operated. For this purpose, a controlling rheostat may be used when the apparatus is driven by an electric motor, or some simple form of accelerating or retarding differential gears may be used when the apparatus is driven by a belt from a line shaft revolving at constant speed.

It will now be obvious to those skilled in the art that various detail modifications of construction in the delivery, in the cut-off, and in the mold actuating parts may be made without departing from the spirit of my invention. For example, in place of mounting each individual receiving mold on a pivoted arm, it may be mounted on a slide, the ways of which are so shaped as to guide the mold in the desired path relative to the carrier on which it is supported, and with which it moves.

Throughout the description and claims, which form this specification, the terms "molten glass", "glass", and "molten material" are used, and intended to be used, as generally descriptive of that comparatively limited class of materials rendered plastic by heat but which do not, in the ordinary commercial manipulation thereof at least, reach such condition of fluidity as to be capable of splashing but, instead, remain viscous and somewhat dough-like in character, glass being probably the most characteristic of these materials and the one most commonly commercially manipulated in that condition.

Having now described my invention in sufficient detail to enable those skilled in the art to readily understand it, I claim:

1. In a glass working apparatus, the combination of two adjacent rotary tables, a plurality of mold carriers associated with one of said tables and each movable with said table and capable of independent arrest during movement of said table, a plurality of mold carriers mounted upon the other table and each movable with said table and capable of independent arrest during movement of said table, the said two sets of mold carriers interengaging and passing through a common point of travel, means for establishing a normal initial relationship between each mold and its table, and means for alternately advancing the two tables toward the point common to the paths of travel of the two sets of mold carriers.

2. In a glass-working apparatus, the combination of a set of molds revoluble about a common axis to bring the several molds successively into registry with a glass delivery line, and a second set of molds revoluble about a common axis other than the axis of the first set and movable successively into the same glass delivery line in alternation with the molds of the companion set.

3. In a glass-working apparatus, the combination of a set of molds revoluble about a common axis and independently arrestable successively at a glass delivery line, driving means for simultaneously acting upon the several molds of the set, said driving means being of such character as to permit independent and successive arrest of the several molds, a second set of molds revoluble about an axis other than the axis of the first set and of similar characteristics, and a similar driving member for said second set, the said two sets of molds being interdigitated to permit successive alternate arrest at the glass delivery line.

In witness whereof, I have hereunto set my hand at Indianapolis, Indiana, this fourteenth day of February, A. D. one thousand nine hundred and thirteen.

FRANK L. O. WADSWORTH.

Witnesses:
ARTHUR M. HOOD,
FRANK A. FAHLE.